J. F. MITCHEL.
Plow-Clevis.

No. 220,938.   Patented Oct. 28, 1879.

ATTEST=
Chas. M. Higgins.
John E. Gavin

INVENTOR=
J. F. Mitchel
by S. H. Wales & Son
atty

UNITED STATES PATENT OFFICE.

JAMES F. MITCHEL, OF MURRAY, KENTUCKY.

IMPROVEMENT IN PLOW-CLEVISES.

Specification forming part of Letters Patent No. 220,938, dated October 28, 1879; application filed July 12, 1879.

*To all whom it may concern:*

Be it known that I, JAMES F. MITCHEL, of Murray, Calloway county, Kentucky, have invented certain new and useful Improvements in Plow-Clevises, of which the following is a specification.

My invention aims to provide a simple form of clevis for plows or other agricultural implements, which shall enable fine degrees of adjustment to be obtained, and admit of quick and easy alteration; and my invention may be stated to consist in a clevis formed of a rotary ratchet-disk, mounted on the head of the plow-beam and engaged by a pawl thereon, and formed with a series of holes around its circumference, whereby the turning of the disk one or more teeth brings the attaching-holes in various positions, while the disk is held against a back movement by the pawl.

Figure 1:
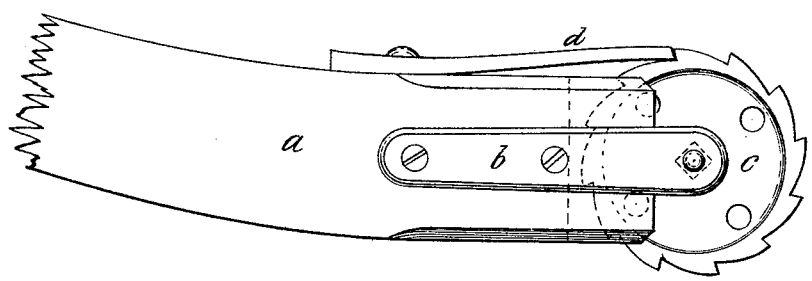
Figure 2:
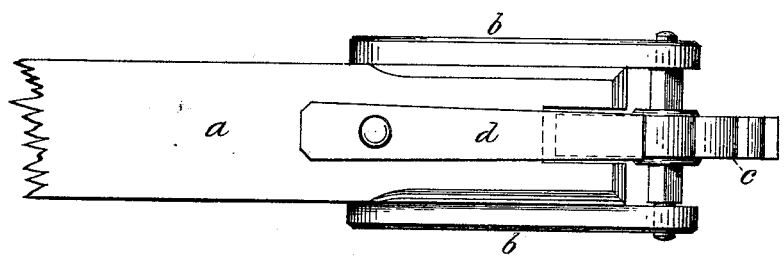

In the drawings, Figure 1 presents a side elevation of my improved clevis fitted to the head of a plow-beam, and Fig. 2 is a plan view thereof.

In the illustration, $a$ indicates the plow-beam, the head of which is fitted with the metallic arms $b\ b$ on either side thereof, which are bolted to the beam, and project forward to receive the axle of the ratchet-disk $c$, which, as shown, is journaled in the said arms, while the disk partly projects into a slot in the head of the beam.

The disk $c$ is perforated with a series of holes near its periphery, which extends through the disk, as shown, and the periphery of the disk is formed with a series of ratchet-teeth, preferably of much greater number than the holes, as illustrated, and these teeth are engaged at the top of the disk by a strong pawl-spring, $d$, fixed on the top of the beam.

The lap-ring of the single-tree is coupled to one of the holes on the lower side of the disk, and it will be seen that the tendency of the disk to turn backward under the strain of the draft will be prevented by the pawl engaging with the teeth. It will also be seen that by turning the disk forward one or more teeth the position of these attaching-holes will be slightly varied, so that any degree of adjustment may be obtained, from a position in front of the axle of the disk to a point directly below it, or a range of one-half the height of the disk, thus enabling the draft to be applied at any point higher or lower within this range, so that the depth of the plow may be regulated with great nicety.

The improved clevis thus provides large or small degrees of adjustment; its adjustment is made very quick and easy by a slight movement, and is self-locking in the desired position; and its action is certain and simple, thus forming a material improvement in devices of this class.

I prefer to form the ratchet-teeth on the extreme periphery of the disk, as illustrated, as this enables finer adjustments to be obtained; but the ratchet-teeth may be formed at a radius within the periphery of the disk, if desired. I also prefer to form holes through the disk, as shown, for attaching the draft; but other suitable means of attachment, such as projecting pins or their equivalent, may be employed.

What I claim as my invention is—

An adjustable clevis, consisting of a rotary ratchet-disk having its teeth engaged by a pawl and formed with a series of holes or other means of attachment around its circumference, substantially as herein shown and described.

J. F. MITCHEL.

Witnesses:
W. L. WEATHERS,
J. G. FELTS.